United States Patent
Suffi et al.

[11] Patent Number: 6,039,578
[45] Date of Patent: *Mar. 21, 2000

[54] NETWORK INTERFACE DEVICE FOR LINE TESTING

[75] Inventors: Louis Suffi, Willow Springs; Arnold M. Ladd, Des Plaines, both of Ill.

[73] Assignee: Reltec Corporation, Mayfield Heights, Ohio

[*] Notice: This patent issued on a continued prosecution application filed under 37 CFR 1.53(d), and is subject to the twenty year patent term provisions of 35 U.S.C. 154(a)(2).

[21] Appl. No.: 08/825,144

[22] Filed: Mar. 25, 1997

Related U.S. Application Data

[60] Provisional application No. 60/015,398, Apr. 2, 1996.

[51] Int. Cl.[7] .................................................. H04M 1/24
[52] U.S. Cl. ................................................ 439/54; 379/19
[58] Field of Search .......................... 439/49, 54, 912; 379/19, 24, 27, 29, 327

[56] References Cited

U.S. PATENT DOCUMENTS

| | | | |
|---|---|---|---|
| 3,535,463 | 10/1970 | Trucco | 379/327 |
| 4,362,905 | 12/1982 | Ismail | 439/638 |
| 4,415,778 | 11/1983 | Turner . | |
| 4,620,765 | 11/1986 | Knickerbocker | 439/344 |
| 4,651,340 | 3/1987 | Marson | 379/327 |
| 4,748,651 | 5/1988 | Collins et al. . | |
| 4,796,289 | 1/1989 | Masor | 379/26 |
| 4,809,323 | 2/1989 | Collins et al. . | |
| 5,092,785 | 3/1992 | Chen | 379/29 |
| 5,297,199 | 3/1994 | Graham et al. . | |
| 5,359,654 | 10/1994 | Jensen et al. . | |
| 5,402,465 | 3/1995 | Foltz . | |
| 5,630,728 | 5/1997 | Watters, Jr. | 439/528 |

OTHER PUBLICATIONS

"RETRONID" product sheets, RFP–8–17 and RFP–8–18, copyright 1996 RELTEC Corporation.

"Features & Benefits, NID/RPT Series Multi–Pair Network Interface" product sheets, Section 5—p. 51 and Section 5—p. 52, copyright Reliance Electic Co. 1992.

"Features & Benefits, OBTNID Series Multi–Pair Network Interface" product sheets, Section 5—p. 52.01 and Section 5—p. 52.02, copyright Reliance Electric Co. 1992.

Primary Examiner—Neil Abrams
Attorney, Agent, or Firm—Jones, Day, Reavis & Pogue

[57] ABSTRACT

A network interface device (37, 37a) for use with a communication system. The communication system includes a plurality of interconnect elements (39) coupled to incoming and outgoing lines (41, 47). The network interface device is selectively and individually coupled to selected ones of said interconnect elements to test incoming lines of the communication system. The network interface device includes a first connector (34) for coupling a shared test device (53) thereto, or the shared test device itself. A second connector (38) is coupled to the first connector, for example, by a cable (36) and is used for selectively and individually coupling to a selected one of the plurality of interconnect elements. The network interface device is normally disconnected from the communication circuit and is a passive element until it is connected to the interconnect element. Use of the second connector will interrupt circuitry between contacts (43, 45) in the selected interconnect element. A pair of binding posts (57, 59) may be coupled to the first connector.

5 Claims, 5 Drawing Sheets

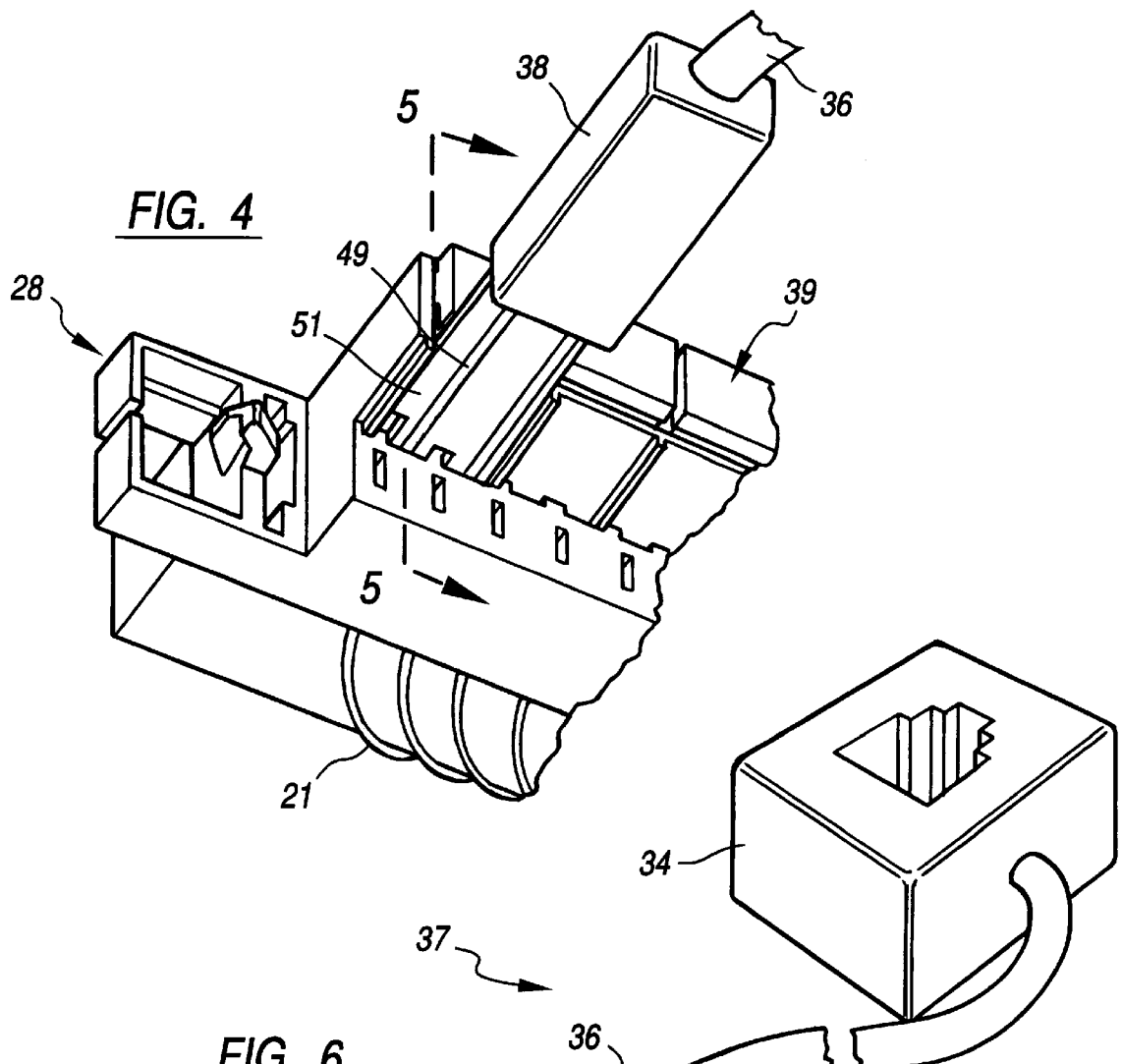
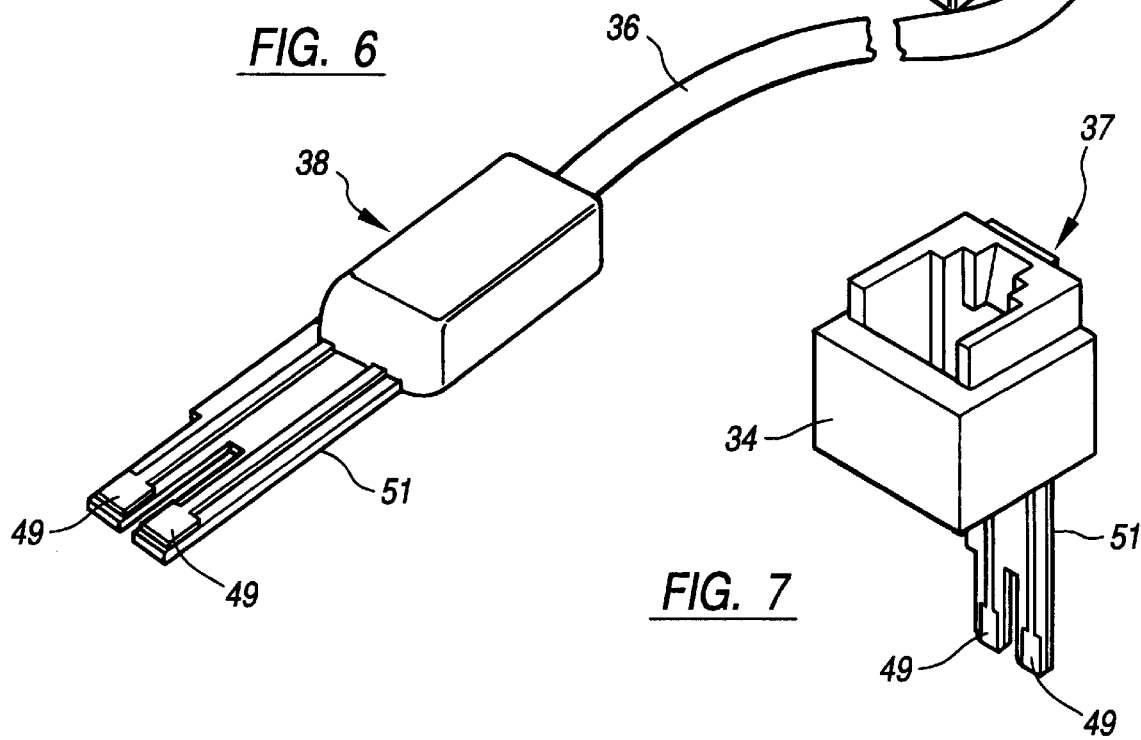

NETWORK INTERFACE DEVICE FOR LINE TESTING

CROSS REFERENCE

This patent application claims the benefit of domestic priority of co-pending U.S. Provisional Application Serial No. 60/015,398, filed Apr. 2, 1996.

BACKGROUND

The present invention relates to network interface devices.

A variety of network interface devices are available which provide station protection and subscriber line termination in a single enclosure. The network interface device enclosures are installed at a customer premise in accordance with FCC Regulations to provide a demarcation point for the customer and also a test point for the customer.

Such network interface device enclosures are often divided into two chambers with one chamber being accessible to the customer and both chambers being accessible by the service provider. Incoming wires are fed into a secure chamber only accessible by the service provider. The incoming lines are connected to a terminal block assembly or other terminal connection. Each set of wires is also connected to a standard RJ11 jack. The service provider is responsible for the service lines up to the RJ11 jacks and terminal block. The house wiring or service drops into the specific facility are the property of the building owner or customer. The customer has access to the network interface device enclosure and may use a telephone or other device to check that service is provided up to the RJ11 jack.

Often, the service provider includes protection devices to provide protection on a line up to their point of responsibility. The protection and portion of the connections up to the RJ11 jack is accessible only by the service company with a female port of the RJ11 jack being accessible to the customer for testing purposes. Alternatively, protection devices may be provided in a separate compartment or enclosure accessible only by the service provider. The terminal blocks provide interconnection and cross-connection and may be provided in the same terminal blocks as the network interface device or between adjacent terminal enclosures such as one containing the protection devices and another containing the network interface devices.

One problem with this type of configuration is that equipment can be quite expensive and require considerable space. In some situations, protection devices are not required and only the network interface devices are used.

Another problem with the currently available network interface devices is that such devices use one RJ11 jack and the appropriate connection for each set of wires. This configuration for the network interface device requires substantial expense and considerable space for housing such RJ11 receptacle and connections. RJ11 jacks and connectors cost approximately $4–$5 per unit and even in small groups, for example, approximately 10 RJ11 jacks, add a considerable cost to such equipment.

An additional consideration with prior art network interface devices is that the RJ11 jacks are active devices coupled directly to the incoming lines. As such, the RJ11 jacks are active devices. Such network interface devices perform satisfactorily in an indoor setting but can become damaged in outdoor settings. In the outdoor setting, RJ11 jacks are exposed to detrimental environmental conditions, and as a result of being active devices, tend to deteriorate at an accelerated rate. Corrosion, dust, dirt and moisture tend to accumulate in the RJ11 jack. In an attempt to overcome the environmental problems environmental protectors including, caps, plugs and sealing substances have been provided to attempt to seal the RJ11 female port. However, as a result of being an active device, corrosion may be delayed by such protectors, but not prevented.

In an electrical sense, an RJ11 jack, being part of the circuit, may introduce noise into the system. If a jack becomes damaged, it may produce a break in the connection thereby requiring additional service calls and service effort to investigate, and possibly repair or replace the RJ11 jack.

Further, the general requirements of the network interface devices are dictated by the FCC and are required to be provided by service providers for services coming into a premises. An example of such devices are RELTEC Corporation, Reliable Electric Division's Sentinel® Network Interface Device, the NID/RPT series Network Interface which provides access and connection for up to 100 pair, and the OBTNID series multi-pair Network Interface for up to 200 pair.

OBJECTS AND SUMMARY

An object of the present invention is to provide a network interface device which can be selectively and individually coupled to one of a plurality of interconnect elements for testing corresponding communication lines connected to the interconnect element.

Another object of the present invention is to provide a network interface device which is not active and remains passive until coupled to an interconnect element.

Still a further object of the present invention is to provide a communication assembly including a plurality of interconnect elements which are connected to a corresponding plurality of incoming and outgoing lines, and which includes a network interface device for selectively and individually coupling to a selected interconnect element to test said incoming line.

Briefly, and in accordance with the foregoing, the present invention envisions a network interface device for use with a communication system. The communication system includes a plurality of interconnect elements coupled to incoming and outgoing lines. The network interface device is selectively and individually coupled to selected ones of said interconnect elements to test incoming lines of the communication system. The network interface device includes a first connector for coupling a shared test device thereto, or the shared test device itself. A second connector is coupled to the first connector and is used for selectively and individually coupling to a selected one of the plurality of interconnect elements. The network interface device is normally disconnected from the communication circuit and is a passive element until it is connected to the interconnect element.

BRIEF DESCRIPTION OF THE DRAWINGS

The organization and manner of the structure and function of the invention, together with further objects and advantages thereof, may be understood by reference to the following description taken in connection with the accompanying drawings, wherein like reference numerals identify like elements, and in which:

FIG. 4 is an enlarged, partial fragmentary, perspective view of a plurality of interconnect elements to which a second connector or plug of the network interface device has been coupled;

FIG. 6 is an enlarged, partial fragmentary perspective view of a network interface device of the present invention which includes a first connector, and a second connector coupled to the first connector; and FIG. 7 is an alternate embodiment of the network interface device as shown in FIG. 6.

DESCRIPTION

Figure 1:
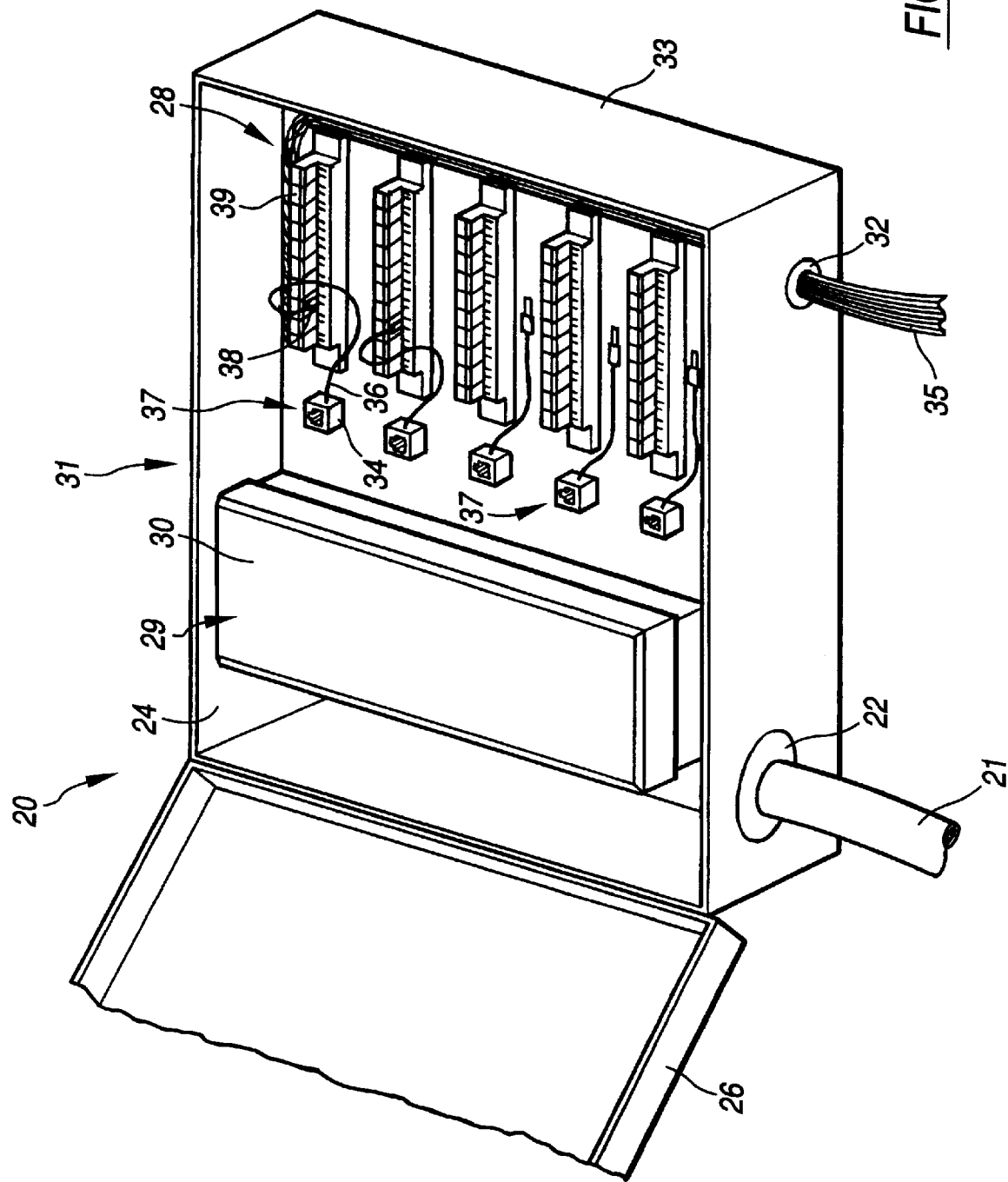
FIG. 1 is a partial fragmentary, perspective view of a communication system which houses a plurality of interconnect elements and network interface devices in an enclosure and which enclosure receives and distributes incoming and outgoing communication lines.
Figure 2:
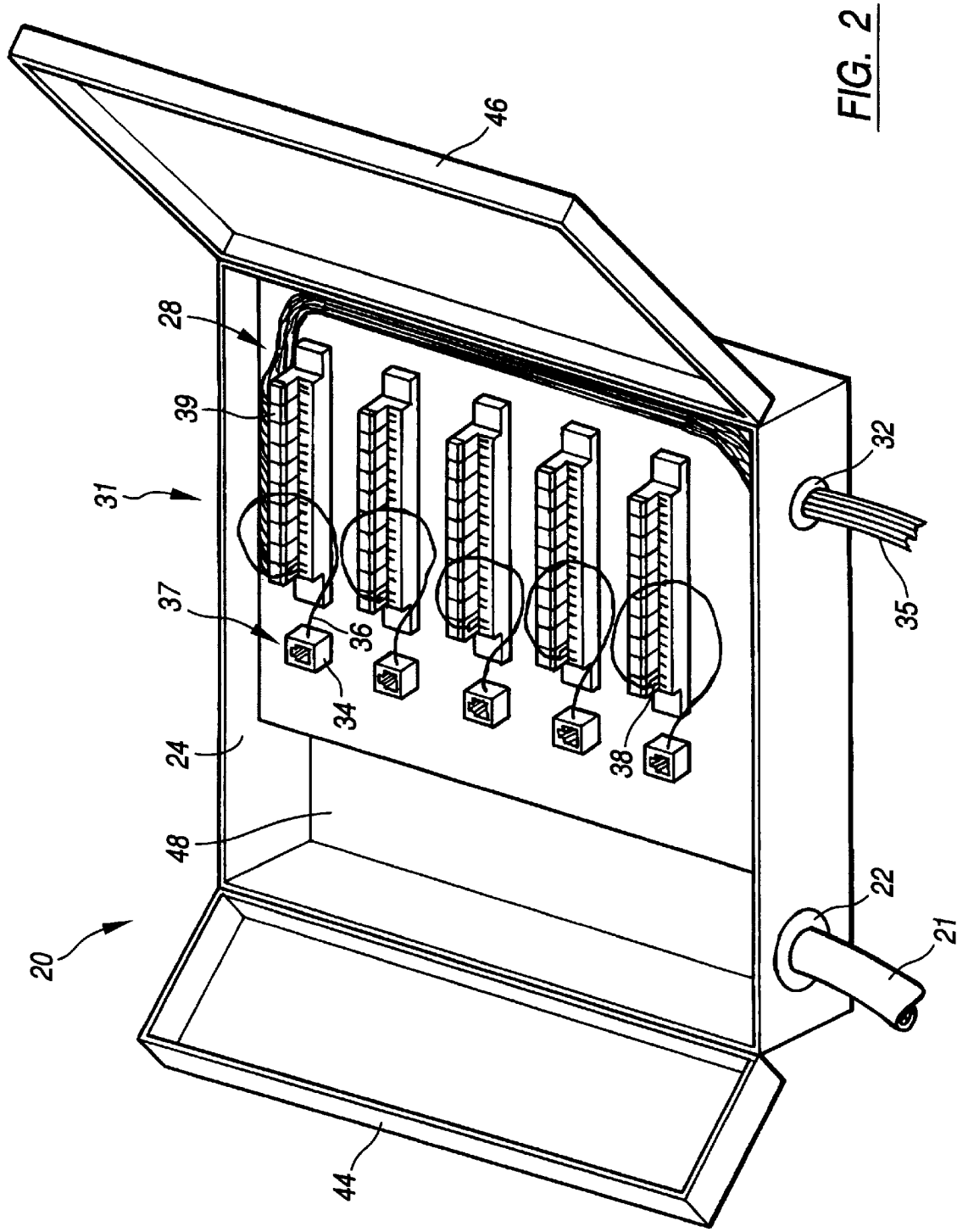
FIG. 2 is an alternate embodiment of the communication system as shown in FIG. 1.

The present invention is shown with further reference to FIGS. 1 and 2 provided herewith. FIG. 1 shows an enclosure 20 which receives an incoming central office cable 21 from a service provider through an entry port 22. The enclosure 20 includes a primary compartment 24 and a cover 26. The wires forming the incoming cable 21 are connected to a series of terminal blocks 28 which are positioned in and accessible from the primary compartment 24. An example of such a terminal block 28 is the URLS Terminal Block manufactured by assignee of the present invention, Reltec Corporation. The enclosure 20 10 provides a mounting structure. It is anticipated that the mounting structure may be provided in a variety of forms, including but not limited to the enclosure, equipments racks, and equipment cabinets.

A protection assembly 29 such as is shown in U.S. Pat. No. 4,827,502, assigned to Reltec Corporation, including a protection compartment 30 is shown in FIG. 1. The protection compartment 30 may be locked so that only the service provider has access to the protection devices retained therein. Apertures 32 are provided in the housing 33 to distribute outgoing wires 35 to customers. These outgoing wires 35 are connected to the terminal blocks 28. The incoming and outgoing lines 21, 35 are attached to the enclosure or mounting structure 20 by extending through the entry port 22 and apertures 32.

The enclosure 20 and the components broadly define a communication assembly 31. The assembly 31 does not require the protection assembly 29. At least one interconnect element 39 is required for in the communication assembly 31 for interconnecting incoming and outgoing lines. A device connector or network interface device 37 of the present invention is shown in FIGS. 1–3, 6 and 7. The network interface device or NID 37 is shown as including a first connector 34 shown herein as a single RJ11 receptacle and a second connector 38 shown herein as a plug. The second connector 38 is coupled to the first connector 34 by a connecting cord 36. The first connector 34 is an inactive element which normally is not connected to the circuit of the communication system and remains a passive element until it is individually and selectively connected to the interconnect element 39. As shown more specifically in FIGS. 4 and 6, the second connector 38 is individually coupled to a selected interconnect element 39 of which there are a plurality comprising the terminal block 28.

While an interconnect element of a known construction is shown in the figures, the interconnect element may be embodied in a variety of configurations. For example, the interconnect element may also take the form of binding posts to interconnect lines. As such, reference to and definition of the interconnect should be given very broad interpretation.

In the configuration as shown in FIGS. 1 and 2, each network interface device 37 is associated with a single terminal block 28. In this configuration, each first connector 34 or RJ11 receptacle 34 can be connected, individually and selectively with any one of the plurality of interconnect elements 39 located on the terminal block 28. The RJ11 receptacle of the NID 37 is passive and only becomes active and part of the communication circuit by connection of the plug 38 with the corresponding interconnect element 39 on the terminal block 28. It should be noted that the connecting cord 36 is sufficient length to reach any of the interconnect elements 39 of the corresponding terminal block 28.

Figure 5:
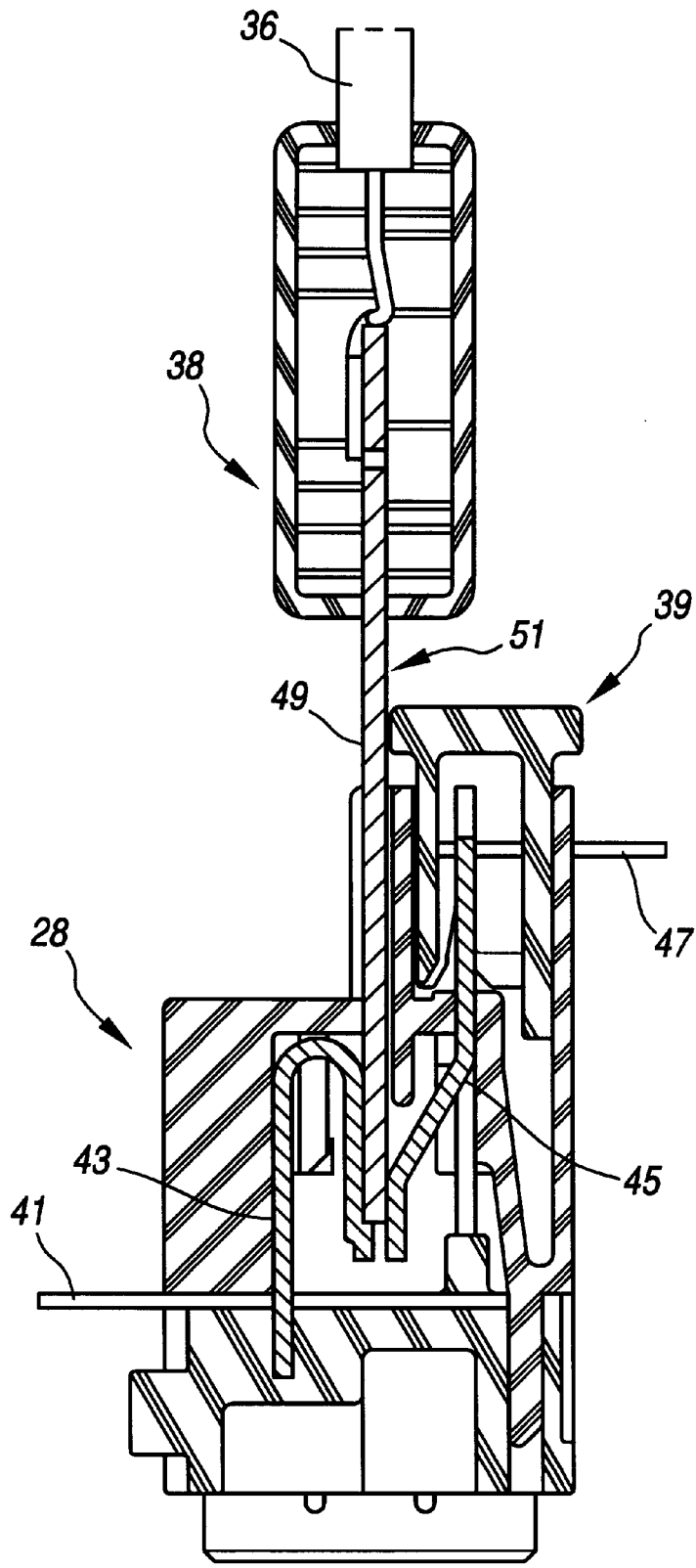
FIG. 5 is a partial fragmentary, cross-sectional, side elevational view taken along line 5—5 in FIG. 4 showing the plug being positioned between two connector elements to isolate incoming and outgoing line connections of said interconnect element.

As mentioned hereinabove, the interconnect elements 39 are coupled to the incoming lines 41 (see FIG. 5). As such, when the plug 38 is inserted between corresponding connectors 43, 45 associated with the incoming and outgoing lines 41, 47, the incoming and outgoing lines 41, 47 are isolated from each other. In this regard, conductive elements 49 are provided on one surface of a probe portion 51 of the plug 38 so as to couple the plug 38 and the first connector or RJ11 receptacle 34 to the incoming lines 41. This connection couples the NID 37 to the incoming lines 41 and disconnects the outgoing lines 47. In this manner, a test device, such as a telephone 53 of known construction can be coupled to the NID 37 to test the incoming line 41.

The RJ11 receptacle 34 is wired to the protection side of the circuit only when the plug 38 is coupled to one of the line 41 via the corresponding interconnect element 39 of the terminal block 28. Only when the plug 38 is engaged with the terminal block 28 is a closed loop or circuit provided. When the plug 38 is engaged with the terminal block 28, the outgoing line 47 or customer sides of the terminal block 28 is isolated from the circuit and the RJ11 receptacle 34 is connected to the incoming line 41 or outside plant. It is still not a completed circuit until a customer connects the telephone 53, having an RJ11 jack 55, into the RJ11 receptacle 34. Once the RJ11 plug 55 is engaged with the RJ11 receptacle 34, the outside plant line 41 of the circuit is connected and may be checked for problems. It should be noted that protection may still be provided on the line 41 thereby protecting the test device 53 connected thereto. The telephone or test device 53 can then be used to dial on the incoming line 41 to determine if there is a problem on this line 41. If the telephone 53 cannot get an outside line, this will indicate to the customer that there is a problem on the incoming line and therefore the service provider must investigate and repair any such problems on the incoming line 41. However, if a connection is made using the telephone 53, this provides an indication that the incoming line 41 is functional and that the problem resides within the customer's premises somewhere on the outgoing line 47.

Removal of the plug 38 from the corresponding interconnect element 39 disconnects the RJ11 receptacle 34 from the terminal block 28. In this condition the receptacle 34 is once again passive and non-functional. When the plug 38 is disengaged from the interconnect element 39 the circuit is returned to normal such that the connectors 43 and 45 make contact. Protection is once again provided via the incoming line 41 to the outgoing line 47.

Figure 3:
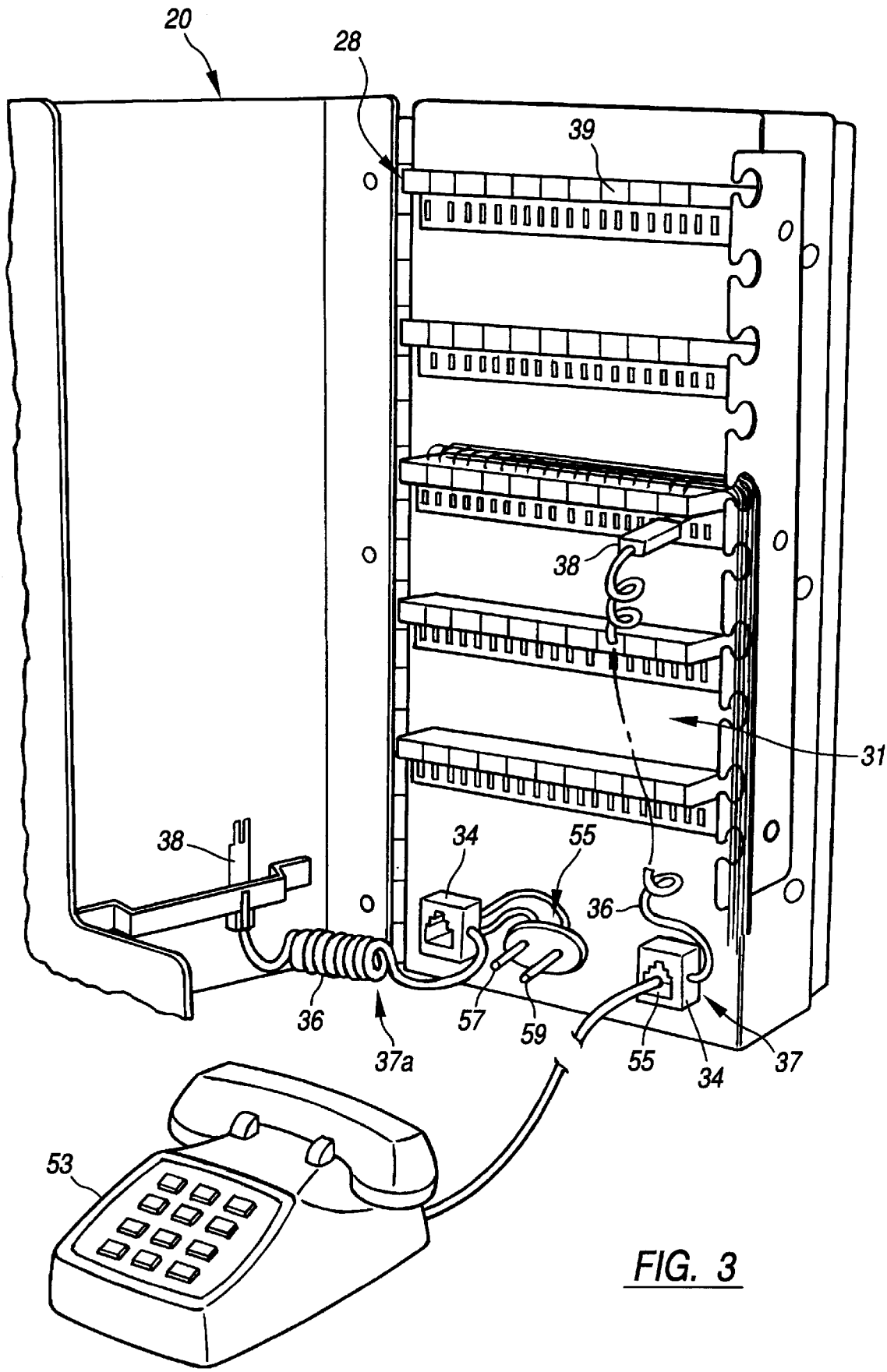
FIG. 3 is a partial fragmentary, perspective view of an alternate embodiment of the communication system of the present invention employing network interface devices similar to those as shown in FIGS. 1 and 2.

As will be appreciated from the foregoing description, the network interface device 37 of the present invention provides many advantages over the prior art. Additionally, it should be understood that the network interface device 37 is not limited to the specific embodiment as shown herein and it is instead intended that a wide variety of configurations of the network interface device may be provided while still remaining within the spirit and scope of the present invention. Primarily, the network interface device is constructed so that one network interface device 37 can be used with a plurality of interconnect elements 39. This is an advantage over the prior art such that one NID 37 can be used to service a large number of interconnect elements 39. With the foregoing in mind, reference is made to FIG. 3 where it is shown that one NID 37 can be used to individually and selectively connect a test device 53 to fifty different interconnect elements 39. As shown in FIG. 3, a second NID may be provided. The provision of a second NID 37a permits multiple simultaneous testing as well as a backup NID in the event that the first NID becomes damaged or is otherwise inoperable.

The second NID 37a includes a binding post assembly 55 having a first 57 and a second 59 bind post extending from the mounting structure 20. As shown in FIG. 3, the binding post assembly 55 is coupled to the receptacle 34. In an alternate embodiment, the plug or second connector 38 is directly coupled to the bind post assembly 55 using the cord 36. The binding post assembly 55 is useful to allow a tradesman to use a standard telephone test handset of known construction to test the line. The standard hand sets have alligator clips and as such connect easily to the binding posts 57 and 59.

Additionally, it is anticipated that many other types of test devices may be employed within the present invention. In general, different testing devices could be used such that they share the NID which is an inactive test point until selectively and individually connected to a selected individual interconnect element 39. Additionally, the selectively disconnectable inactive design of the NID 37 of the present invention enhances line transmissions such that there is one less element which is constantly and actively connected to the line. In this regard, prior art NIDs are constantly and actively connected to individual corresponding lines. As such, if there is any damage to or degrading of the prior art NID such as by corrosion, moisture or other particulate matter, the transmission line may be correspondingly degraded.

As a further example of a different type of test device which may be employed with the NID 37 of the present invention is the use of a maintenance termination unit or "MTU". The MTU can be provided as a packaged device attached to the frame or mounting structure such as an enclosure as shown in FIGS. 1–3. The MTU is another form of test device 53. One MTU is all that is necessary to be provided with a plurality of interconnect elements 39 to provide testing of these interconnect elements. The MTU includes a plug 38 which is connected to the interconnect element 39 as shown in FIG. 4 to isolate the outgoing line 47 from the incoming line 41. The subscribers can then contact the telephone company to try and activate the MTU using the incoming line 41. If the telephone company is unsuccessful in operating the MTU, this provides information to the telephone company that it is the incoming line 41 that may have the problem. This application of an MTU is advantageous because it makes the MTU an inactive element while not in use instead of an active element. It should be noted that MTUs are widely used throughout the telephone industry. However, they are constantly and specifically connected to individual communication lines and are not designed for selective and individual use. Additionally, an MTU unit, being a separate electronic device, is substantially more expensive than an RJ11 jack as employed in the simplest form of the present invention. Additionally, substantial cost savings can be achieved by providing only one MTU for a multiplicity of lines as compared to the current use of individual MTUs for individual lines.

An additional advantage of the present invention is that it may be used to retrofit existing systems which do not have network interface devices. Under current federal standards, all telephone systems should include network interface devices to provide customers with a demarcation point whereby they can test the incoming line. Provision of this demarcation point eliminates the need for a tradesman to investigate every potential line problem thereby saving the telephone company money especially if the line problem resides in the customer's premises. In older systems which do not include the network interface device, the present invention, which is a passive element, may be attached in any one of many forms to a communication assembly. For example, the NID 37 may be glued, mechanically fastened, tethered or otherwise attached to the enclosure. This simplicity of attachment is achieved since no electrical connections are required between the NID and the communications assembly. Electrical connections are achieved by engaging the plug 38 with a selected, individual interconnect element 39. The test device 53 is coupled to the receptacle 34 thereby completing the circuit from the incoming line 41 to the telephone 53.

It will be also appreciated that the first connector 34 and the second connector 38 can be presented in a variety of connector forms and are not limited to the female RJ11 receptacle 34 and male probe type plug 38 as specifically shown in FIG. 6. Rather, it is anticipated that the present invention may include first and second connectors 34, 38 which includes standardized male or female connectors, proprietary male and female connectors, connectors which may be attached to binding posts, threadedly attached to corresponding connectors and any other type of connector device which might be used for such communication assembly to provide interconnection between the incoming line 41 and a test device 53 in a manner which provides an inactive NID 37 which can be selectively and individually used with a plurality of interconnect elements 39.

Furthermore, it is anticipated that the NID 37 of the present invention may be used in a configuration which includes a single interconnect element 39 for receiving a single pair of incoming lines 41 and connecting to a single pair of outgoing lines 47. Such a configuration may be employed in a residential setting whereby an incoming line 41 is brought from the street or curb side to a residence and connected to an incoming line 47 installed within the residence. The NID would be provided in conjunction with this single interconnection element 39 to allow the customer to selectively connect the NID to the interconnect element 39. This application of the NID 37, as an inactive element unless specifically and selectively connected, removes a component from the communication line which provides the benefits as described hereinabove. Further, the NID 37 may be removed from the interconnect element 39 and from the mounting structure thereby preventing unauthorized access to the incoming line 41 in the event that the interconnect element 39 is positioned outside of the residence.

It should be understood that the above description equally applies to network interface devices 37 which are not equipped with protection. In this situation, only the terminal blocks 28 and the RJ11 receptacle 34 are used. The terminal block 28 is wired to the outside plant or central office and the terminating end of the block is designated for and accessible by the customer. The RJ11 receptacle 34 is used in the same way as described above with the only exception that the RJ11 receptacle 34 is internally wired directly to the terminal blocks ahead of the disconnect or isolation points of the block 28.

The device as shown in FIG. 2 shows the assembly having two doors 44,46 which enclose the primary compartment 24 and the terminal blocks 28 and RJ11 receptacles 34 retained therein. The device shown in FIG.2 does not include protection but a protection module may be inserted into the cavity 48 provided therein. Additionally, the use of independent doors 44,46 will allow the protection to be accessible only to the service provider with the terminal blocks 28 and RJ11 receptacles 34 being accessible to the customer and service provider.

The NID 37 of the present invention provides many advantages over the prior art NIDs. The NID 37 of the present invention provides an inactive, selectively and individually connectable element which can be provided as a single NID 37 for use with a plurality of interconnect elements 39. The reduction in the number of NIDs reduces the cost and increases the reliability of the communication system. The reliability is increased by disconnecting the NID from the active circuit thereby preventing and reducing the development of corrosion within connectors of the NID. Further, if a NID needs to be replaced, it can be done so quickly and easily with little expense. The use of the second connector 38 coupled by the connecting cord 36 to the first connector 34 and the interconnect element 39 allows a single connector 34 to be used selectively and individually with a plurality of interconnect elements on a terminal block 28.

By removing the NID 37 from the circuit, noise on the circuit is reduced. When a connector becomes damaged or needs to be replaced, it can be done so without affecting the service because it does not require disconnection from the circuit. Furthermore, only one NID 37 will need to be replaced at a given time for a corresponding system. Further, while the interconnect elements 39 of the terminal blocks 28 are designed to resist rather severe environmental conditions, the connectors 34, 38 such as the RJ11 receptacle 34 and plug 38 are not designed to such a degree of reliability. As such, it is expected that such receptacles will need to be replaced over time or such connectors can be equipped with the necessary protective features of known construction.

While a preferred embodiment of the present invention is shown and described, it is envisioned that those skilled in the art may devise various modifications and equivalents without departing from the spirit and scope of the invention as defined by the appended claims. The invention is not intended to be limited by the foregoing disclosure.

The invention claimed is:

1. An interface test assembly for use in a telephone communication network including an incoming central office cable and outgoing customer telephone lines comprising:

a housing;

the housing including at least one terminal block assembly having at least one telephone line interconnect element for selectively interconnecting the incoming central office cable to at least one of the outgoing customer telephone lines;

a normally inactive receptacle element fixedly mounted in the housing and coupled to a plug member;

the plug member is positioned adjacent the terminal block assembly in the housing and is structured and dimensioned to be individually coupled to a selected one of the telephone line interconnect elements of the terminal block assembly to disconnect interconnection through the selected telephone line interconnect element between the incoming central office cable and an outgoing customer telephone line thereby isolating the incoming central office cable from the selected outgoing customer line while simultaneously causing the normally inactive receptacle element coupled to the plug member to be activated enabling testing of the incoming central office cable for default conditions by coupling a test device to the receptacle element;

the receptacle element remaining inactive until the plug member is coupled to at least one of the telephone line interconnect elements of the terminal block assembly.

2. The interface test assembly of claim 1 including a test device coupled to the receptacle member to test the incoming central office cable.

3. The interface test assembly of claim 2 wherein the test device is a telephone.

4. The interface test assembly of claim 1 wherein the plug member has a probe portion for disconnecting interconnection between the incoming central office cable and the outgoing customer telephone line.

5. The interface test assembly of claim 4 wherein a conductive element is positioned on a surface of the probe portion of the plug member so as to couple the plug member to the incoming cable and to activate the normally inactive receptacle element coupled to the plug member.

* * * * *